US011333895B1

(12) United States Patent
Ginzburg et al.

(10) Patent No.: US 11,333,895 B1
(45) Date of Patent: May 17, 2022

(54) SYSTEMS AND METHODS FOR STRUCTURED LIGHT PROJECTOR OPERATIONAL SAFETY

(71) Applicant: Facebook Technologies, LLC, Menlo Park, CA (US)

(72) Inventors: Jonatan Ginzburg, Sunnyvale, CA (US); Mark Timothy Sullivan, Mountain View, CA (US); Benjamin Nicholas Jones, Mountain View, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 308 days.

(21) Appl. No.: 16/406,377

(22) Filed: May 8, 2019

Related U.S. Application Data

(60) Provisional application No. 62/791,546, filed on Jan. 11, 2019.

(51) Int. Cl.
*G02B 27/09* (2006.01)
*G02B 27/01* (2006.01)

(52) U.S. Cl.
CPC ..... *G02B 27/0944* (2013.01); *G02B 27/0172* (2013.01)

(58) Field of Classification Search
CPC .................. G02B 27/0944; G02B 27/0172
See application file for complete search history.

(56) References Cited

U.S. PATENT DOCUMENTS

| 7,330,315 | B2 | 2/2008 | Nilsen |
| 8,639,072 | B2 | 1/2014 | Popovich et al. |
| 8,749,796 | B2 | 6/2014 | Pesach et al. |
| 9,528,906 | B1* | 12/2016 | Yasovsky ........... G01M 11/0207 |
| 9,541,383 | B2 | 1/2017 | Abovitz et al. |
| 9,612,403 | B2 | 4/2017 | Abovitz et al. |
| 9,671,566 | B2 | 6/2017 | Abovitz et al. |
| 9,847,619 | B2 | 12/2017 | Chern et al. |
| 9,927,571 | B2 | 3/2018 | Futterer |
| 10,073,004 | B2* | 9/2018 | Medower ............. G01N 21/958 |
| 10,089,516 | B2 | 10/2018 | Popovich et al. |
| 10,145,533 | B2 | 12/2018 | Popovich et al. |
| 10,241,330 | B2 | 3/2019 | Popovich et al. |
| 10,317,684 | B1 | 6/2019 | Lee |

(Continued)

OTHER PUBLICATIONS

Hasbun, Robert, "Low-Profile Apparatuses And Methods For Projecting Structured Light", U.S. Appl. No. 16/281,471, filed Feb. 21, 2019, 67 pages.

(Continued)

*Primary Examiner* — Robert E. Tailman
(74) *Attorney, Agent, or Firm* — FisherBroyles, LLP

(57) ABSTRACT

The disclosed system may include (1) a diffractive optical element (DOE) stack including one or more DOEs, where the DOE stack generates, in response to incoming light received at a first side of the DOE stack, structured light from a second side of the DOE stack opposite the first side, (2) a primary light source that emits the incoming light toward the first side of the DOE stack, and (3) at least one photodetector that detects light emitted from an edge of each of at least one of the DOEs of the DOE stack, where the edge is located between the first side and the second side of the DOE stack. Various other methods and systems are also disclosed.

19 Claims, 13 Drawing Sheets

(56) References Cited

U.S. PATENT DOCUMENTS

| | | |
|---|---|---|
| 10,345,506 B1 | 7/2019 | Lyu |
| 10,684,408 B2 | 6/2020 | Wang et al. |
| 10,698,086 B1 | 6/2020 | Zhu et al. |
| 10,782,537 B1 | 9/2020 | Chao et al. |
| 10,931,935 B2 | 2/2021 | Xiao et al. |
| 2002/0001110 A1 | 1/2002 | Metz et al. |
| 2003/0020975 A1 | 1/2003 | Metz et al. |
| 2008/0285310 A1 | 11/2008 | Aylward et al. |
| 2009/0185274 A1 | 7/2009 | Shpunt |
| 2010/0278480 A1 | 11/2010 | Vasylyev |
| 2011/0096529 A1 | 4/2011 | Wheatley et al. |
| 2011/0187878 A1 | 8/2011 | Mor et al. |
| 2011/0188054 A1 | 8/2011 | Petronius et al. |
| 2014/0049983 A1 | 2/2014 | Nichol et al. |
| 2014/0307307 A1 | 10/2014 | Georgiou et al. |
| 2015/0016777 A1 | 1/2015 | Abovitz et al. |
| 2015/0253123 A1 | 9/2015 | Braker et al. |
| 2015/0338660 A1 | 11/2015 | Mukawa |
| 2016/0025993 A1 | 1/2016 | Mor et al. |
| 2019/0179150 A1 | 6/2019 | Pierer et al. |
| 2019/0249984 A1 | 8/2019 | Barlev et al. |

OTHER PUBLICATIONS

Non-Final Office Action received for U.S. Appl. No. 16/281,471 dated Jan. 28, 2021, 64 pages.

Hasbun et al., "Low-Profile Apparatuses And Methods For Projecting Structured Light", U.S. Appl. No. 16/223,637, filed Dec. 18, 2018, 54 pages.

\* cited by examiner

SYSTEMS AND METHODS FOR STRUCTURED LIGHT PROJECTOR OPERATIONAL SAFETY

CROSS REFERENCE TO RELATED APPLICATION

This application claims the benefit of priority to U.S. Provisional Application No. 62/791,546, filed Jan. 11, 2019, the disclosure of which is incorporated herein, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
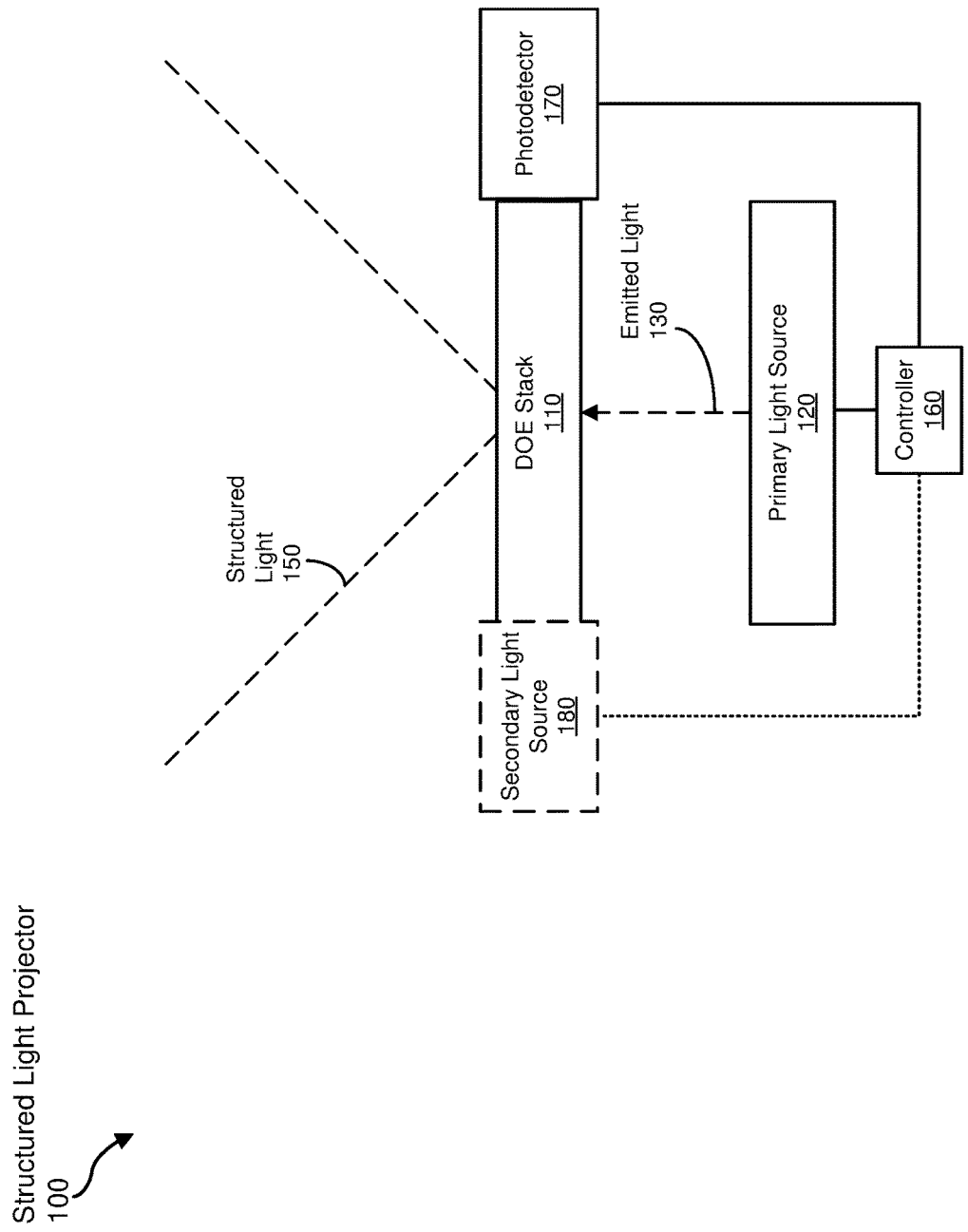
FIG. 1 is a block diagram of an exemplary structured light projector, including a DOE stack and a primary light source, that facilitates operational safety.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Structured light projectors, which, as the name indicates, project structured light (e.g., light patterns of dots, lines, or other geometric shapes) into a surrounding local environment, are typically employed to measure distances from a device incorporating the projector to various objects or surfaces in the environment. To measure those distances, a camera associated with the projector may be employed to capture an image of the portion of the structured light that is reflected toward the camera, and a processor may then analyze that image to ascertain or "map" the surfaces that are illuminated by the structured light.

In many conventional structured light projectors, a laser may be employed to generate light that may then pass through one or more diffractive optical elements (DOES) of a DOE stack, which may diffract the laser light to generate structured light that illuminates a particular field of view (FOV) of the surrounding environment. Consequently, at least some conventional structured light projectors may include one or more photosensitive devices (e.g., one or more photodetectors located on the laser side of the DOE stack) to capture light reflected from the DOE stack back toward the light source to help determine whether certain anomalies present within the structured light projector may represent an unsafe condition for a user of the device in which the projector is employed (e.g., an artificial reality head-mounted display (HMD)) and/or someone in the vicinity thereof.

The present disclosure is generally directed to systems and methods that facilitate operational safety in structured light projectors. As will be explained in greater detail below, embodiments of the instant disclosure may include a diffractive optical element (DOE) stack including one or more DOEs, where the DOE stack generates, in response to incoming light received at a first side of the DOE stack, structured light from a second side of the DOE stack opposite the first side. The system may also include a primary light source that emits the incoming light toward the first side of the DOE stack. Further, the system may include at least one photodetector that detects light emitted from an edge of each of at least one of the DOEs of the DOE stack, where the edge is located between the first side and the second side of the DOE stack. Consequently, in at least some examples, the light detected at the at least one photodetector may be indicative of one or more structural problems associated with the DOE stack, such as imperfections (e.g., cracks) in one or more of the DOEs, moisture between DOEs or along the first or second sides of the DOE stack, misalignment of the DOE stack or one or more DOEs (e.g., relative to the primary light source or each other), and the like, which may adversely affect operational efficiency, and possible operational safety, of the structured light projector.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-13, detailed descriptions of various systems and methods for facilitating operational safety in a structured light projector. A discussion of an exemplary structured light projector is presented in conjunction with FIG. 1, and a brief discussion of exemplary types of DOEs employable in the structured light projectors disclosed herein is presented with respect to FIG. 2. Presentations of various exemplary embodiments of a structured light projector facilitating operational safety are provided in connection with FIGS. 3-6. Exemplary methods of facilitating operational safety in conjunction with a structured light projector are discussed in conjunction with FIGS. 7 and 8. In conjunction with FIGS. 9 and 10, examples of a head-mounted display (HMD) system including an exemplary structured light projector, as described herein, are discussed. Several exemplary artificial reality systems that may incorporate such structured light projector systems are described in conjunction with FIGS. 11-13.

FIG. 1 is a block diagram of an exemplary structured light projector 100. In some examples, structured light projector 100 may include a DOE stack 110 including one or more DOEs, and a primary light source 120. Structured light projector 100, in at least some embodiments, projects structured light 150 (e.g., dots, lines, or other geometric shapes) into an environment surrounding structured light projector 100. In some examples, structured light projector 100 may be employed in conjunction with a camera or other light-sensing device (not shown in FIG. 1) that detects or captures reflections of structured light 150 from various objects or surfaces located in the surrounding environment. The captured or detected light, in some embodiments, may then be analyzed to map the objects and surfaces of the surrounding area.

In the example of FIG. 1, as well as others described hereinafter, an optical path from primary light source 120 to DOE stack 110 is shown as being directed vertically upward. This directional convention is utilized to simplify the following discussion. However, such an orientation of structured light projector 100 is not required and may assume any orientation relative to some reference direction in other examples.

In operation, in at least some embodiments, primary light source 120 may generate and emit light 130 toward DOE stack 110. As indicated in FIG. 1, emitted light 130 may travel across a space between primary light source 120 and DOE stack 110 in at least some embodiments. In some examples, as described in greater detail below, primary light source 120 may employ one or more light sources or devices (e.g., one or more infrared or visible-light lasers, such as Class 3R or Class 4 lasers) to generate emitted light 130. Additionally, if multiple such devices are used, such devices may be activated simultaneous, or at varying times, and with constant or varying levels of intensity or duty cycle. Primary light source 120, in some embodiments, may also include one or more additional optical components (e.g., a light-guide, a collimator, and/or the like) to further condition the light generated by primary light source 120 to produce emitted light 130. In some embodiments, a controller 160 (e.g., a hardware processor or controller, or a processor that executes one or more instructions of firmware, software, or the like) may control the operation of primary light source 120, including any light-emitting devices included therein.

DOE stack 110, in at least some examples, may receive emitted light 130 and project structured light 150 into the surrounding environment based on the received emitted light 130. In various embodiments, DOE stack 110 may include one or more DOEs that may generate a light pattern (e.g., dots, lines, or other geometric shapes) using emitted light 130 to produce structured light 150. Also, in some examples, multiple DOEs may be implemented within DOE stack 110 (e.g., to provide a large field of view (FOV) of the surrounding environment that is illuminated with structured light 150). In some embodiments, DOE stack 110 may include one or more additional optical components (e.g., a collimator) that conditions emitted light 130 for use by one or more DOEs of DOE stack 110 to produce the desired structured light 150. Moreover, in some examples, two or more of the optical elements of DOE stack 110 may be substantially adjacent to each other, such that very little or no free-space region is present between the optical elements, especially when compared to the space between primary light source 120 and DOE stack 110.

Also included in structured light projector 100 may be at least one photodetector 170. As indicated in FIG. 1, photodetector 170 may be optically coupled to an edge of DOE stack 110 (e.g., a surface between (e.g., joining) a first side of DOE stack 110 at which emitted light 130 is received and a second side of DOE stack 110 from which structured light 150 is emitted). In some embodiments, photodetector 170 may be operated (e.g., under control of controller 160) to detect light exiting the edge of DOE stack 110 resulting from emitted light 130 produced by primary light source 120. In at least some embodiments, photodetector 170 may be one or more photodiodes, phototransistors, or other light-sensitive devices.

In other examples, structured light projector 100 may include a secondary light source 180 optically coupled with another edge of DOE stack 110 (e.g., an edge opposite the edge of DOE stack 110 to which photodetector 170 is optically coupled). In some embodiments, secondary light source may be one or more light-emitting diodes (LEDs) or other light-emitting devices. In such examples, photodetector 170 may be operated (e.g., under control of controller 160) to detect light exiting the edge of DOE stack 110 resulting from light emitted by secondary light source 180. Further, in some examples, controller 160 may operate secondary light source 180 such that secondary light source 180 and primary light source 120 are not emitting light at the same time.

FIG. 1 depicts photodetector 170 and/or secondary light source 180 as being positioned adjacent to at least one edge of DOE stack 110. In such examples, photodetector 170 and/or secondary light source 180 may be coupled to DOE stack 110 by way of an optical coupler material, as described more fully below. In other embodiments, photodetector 170 and/or secondary light source 180 may be located some distance away from the at least one edge of DOE stack 110 by the use of a light guide or similar optical element that optically couples photodetector 170 and/or secondary light source 180 to at least one edge of DOE stack 110.

In each of the embodiments described above, controller 160 may use the light detected by photodetector 170 to determine a safety status of structured light projector 100 (e.g., whether operation of structured light projector 100 would currently result in a safe or unsafe condition for a user of system employing structured light projector 100 or another person). Examples of unsafe conditions may include, but are not limited to, moisture on or within DOE stack 110, movement of an optical element within DOE stack 110, irregularities (e.g., surface scratches) of an optical element within DOE stack 110, improper intensity of emitted light 130 from primary light source 120, and so on. In some cases, such conditions may result in abnormalities (e.g., magnification or concentration) of structured light 150 being projected into the environment surrounding structured light projector 100. Further, in some examples, in response to an unsafe condition being detected, controller 160 may cause structured light projector 100 to be turned off or otherwise disabled (e.g., prevented from generating structured light 150 or other light) to ensure structured light projector 100 is rendered safe for the user and others nearby.

Figure 2:
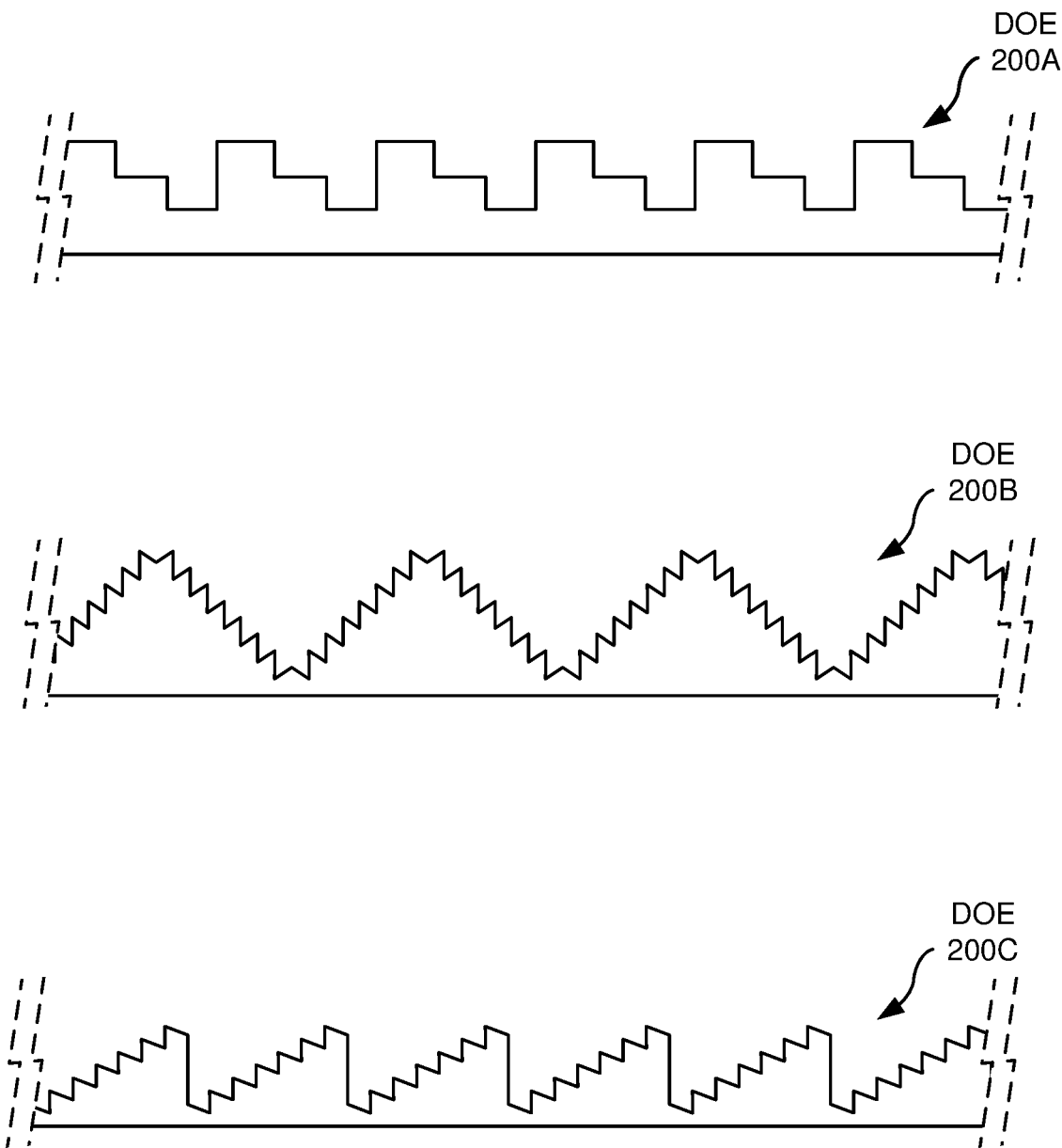
FIG. 2 is a side view of exemplary DOEs that may be included in the DOE stack of FIG. 1.

FIG. 2 provides exaggerated partial cross-sectional views of three different example DOEs 200 (more specifically, a first DOE 200A, a second DOE 200B, and a third DOE 200B) that may serve as one or more DOEs 200 of DOE stack 110. First DOE 200A includes, for example, a horizontal step pattern imposed as a micro-structured surface of DOE 200A. In some examples, the steps may have a top surface parallel to a bottom surface of DOE 200A. The width of the steps may be the same or different, and the height difference between adjacent steps may also be the same or different. The horizontal step pattern of DOE 200A may be the same across the entire structure or may have regions that are different (e.g., including a different step pattern). Second DOE 200B includes, for example, a series of pyramidal structures having steps on either side. These steps may be angled with respect to the bottom surface of DOE 200B. In some examples, the angles may be in a range from approximately 15 degrees to approximately 75 degrees and may be uniform or nonuniform, such that some of the steps may have different angled top surfaces. Third DOE 200C includes, for example, a structure with a plurality of steps (angled as shown, but parallel to the bottom surface of DOE 200C in other embodiments) that ascend to a highest step and then drop (rather than gradually descend, as in DOE 200B) to the lowest step in the pattern. In some embodiments, the depicted cross-sections of DOEs 200 may extend the full length of DOE 200. Other embodiments may include different cross-sectional configurations, such that the pattern varies in x- and y-directions of the top surface of DOE 200. In other embodiments, DOE 200 may be provided by diffraction gratings having different spacings therebetween. Additionally, while each of DOEs 200 is shown to employ a micro-structured surface on a single side of DOE 200, other DOEs 200 may employ micro-structured surfaces on both sides of DOE 200, or may employ another structure to generate structured light 150. In various embodiments, DOEs 200 may generated structured light 150 by diffracting received light (e.g., light originating from primary light source 120) to form the various features of structured light 150. In some embodiments, DOEs 200 may be substantially planar in appearance (e.g., by being substantially thinner in the vertical direction than in either horizontal direction, as depicted in FIG. 2).

Figure 3:
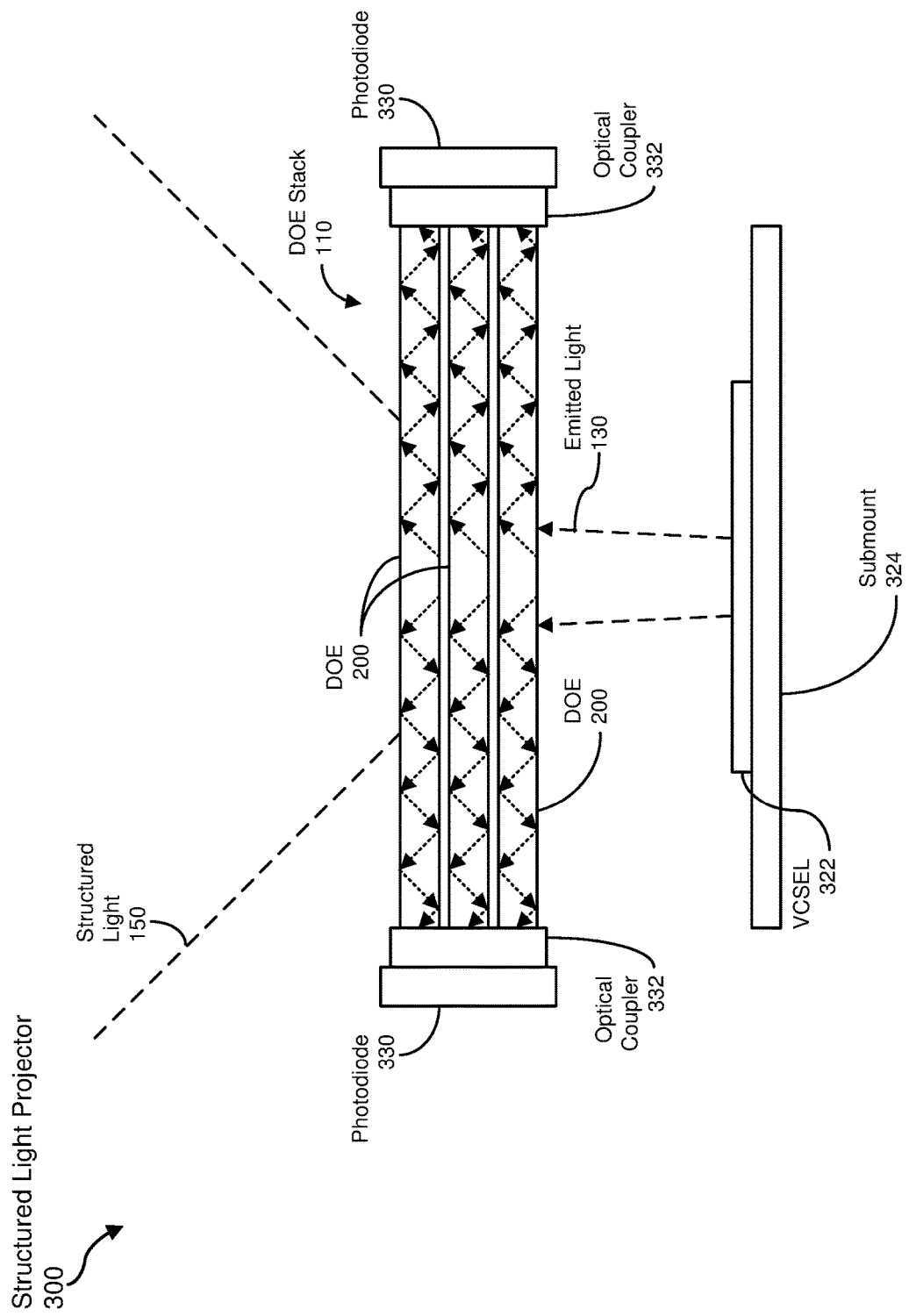
FIG. 3 is a side view of an exemplary structured light projector that includes at least one photodetector for detecting light from an edge of the DOE stack in response to light from the primary light source.
Figure 4:
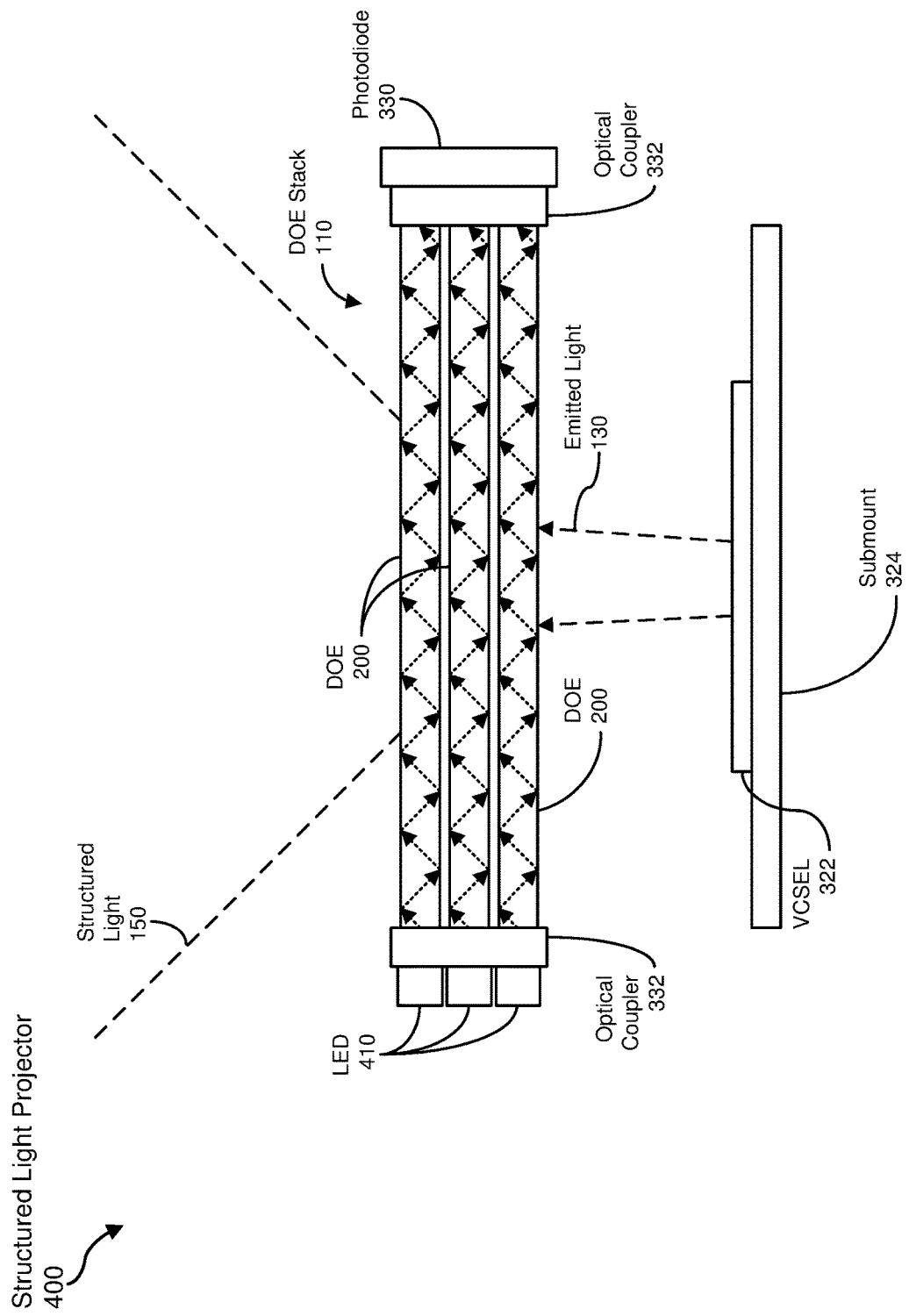
FIG. 4 is a side view of an exemplary structured light projector that includes at least one photodetector for detecting light from an edge of the DOE stack in response to light from a secondary light source.

FIGS. 3 and 4 are side views of exemplary structured light projectors 300 and 400, respectively, that include at least one photodiode 330 (e.g., serving as photodetector 170) for detecting light from an edge of DOE stack 110 in response to light from a vertical-cavity surface-emitting laser (VCSEL) 322 (e.g., serving as primary light source 120). Further, VCSEL 322 may be mounted upon a submount 324, which, in some embodiments, may provide electrical connections (e.g., power and ground connections, control and status signals, and the like) between VCSEL 322 and other components of structured light projector 300 (e.g., a controller, such as controller 160, a power supply, and so on). In some examples, submount 324 may also serve as a heat-conducting medium to dissipate heat generated by VCSEL 322. Other primary light sources aside from VCSEL 322 (e.g., other types of lasers, an addressable array of VCSELs or other lasers, and so on) may be employed in other examples.

As depicted in FIGS. 3 and 4, DOE stack 110 may include one or more DOEs 200. In some embodiments, DOEs 200 may include other types of optical elements not depicted in FIG. 2, such as collimators. While FIGS. 3 and 4 illustrates the user of three DOEs 200 in DOE stack 110, greater or fewer DOEs 200 may be employed in other embodiments of DOE stack 110. In some examples, DOEs 200 may be bonded (e.g., using an adhesive, such as along a perimeter of DOEs 200), clamped, or otherwise coupled together to form a unitary DOE stack 110. In some embodiments, small free-space regions may be located between one or more pairs of DOEs 200, while in other examples, two or more adjacent DOEs 200 may be aligned so that no such free-space region exists therebetween.

In some examples, each DOE 200 of DOE stack 110 may include a different micro-structured surface such that a first DOE 200 generates a first light pattern based on the received emitted light 130, and a second DOE 200 (e.g., adjoining a top surface of first DOE 200) generates structured light 150 based on the first light pattern. Further, in such embodiments, first DOE 200 may provide a particular FOV for the first light pattern, while second DOE 200 may further broaden the resulting FOV to yield the FOV exhibited by structured light 150. DOEs 200 may be manufactured using, for example, without limitation, injection compression molding, nano-imprinting (e.g., using one or more etchants), or nano-replication.

Also, in both FIGS. 3 and 4, photodiode 330 may be optically coupled to an edge of DOE stack 110 (e.g., an edge of each DOE 200 of DOE stack 110) by way of an optical coupler 332. In some examples, optical coupler 332 may be an optical coupler material having a refractive index that substantially matches the refractive index of one or more DOEs 200 of DOE stack 110 (e.g., index-matching epoxy). In some examples, an edge of each of two or more DOEs 200 may be aligned in a single plane. Consequently, in those examples, photodiode 330 may be coupled (e.g. via optical coupler 332) to each of the two or more DOEs 200 simultaneously. In other embodiments, a separate photodiode 330 may be optically coupled (e.g., via an associated optical coupler 332) to each corresponding DOE 200.

In structured light projector 300 of FIG. 3, at least one additional photodiode 330 may be coupled to another edge of DOE stack 110 (e.g., opposite the edge to which first photodiode 330 is optically coupled) to detect light at the other edge of DOE stack 110. The additional photodiode 330 may be optically coupled to one or more DOEs 200 to detect light exiting the other edge. Additional photodiodes 330 may also be employed in other examples. For instance, if DOEs 200 exhibit four edges (e.g., corresponding to four sides of a rectangle) that join the sides through which emitted light 130 is to be passed and from which structured light 150 is emitted, four photodiodes 330 may be employed to detect light exiting those four edges.

In various embodiments, photodiodes 330 may be configured to detect an amount of light originating from VCSEL 322 that exits edges of DOE stack 110 instead of being passed through a side of DOE stack 110 as structured light 150. In some examples, such light may be transmitted internally within DOEs 200 toward the edges based in part on the physical structure of each DOE 200, as well any material (e.g., water or other liquid) contacting the sides of each DOE 200. In some examples, the amount of light detected at photodiode 330 may change based on changes in DOE 200 or DOE stack 110 structure or upon the introduction or removal of a substance on the sides of DOEs 200. Examples of changes may include, but are not limited to, the introduction of water between DOEs 200 or on either side of DOE stack 110, the formation of cracks or other anomalies within DOEs 200, a movement of one or more DOEs 200 within DOE stack 110, and so on. Accordingly, in some embodiments, photodiodes 330 may be used (e.g., by controller 160) to monitor from time to time the amount of light received at the edges of DOE stack 110 in response to emitted light 130 from VCSEL 322. In some examples, the amount of light detected at photodiodes 330 may be compared to another amount of light detected at photodiodes 330 at some earlier point in time (e.g., at a time at which the safety status of structured light projector 300 was known to be good). In some embodiments, that earlier point in time may be during a testing or adjustment phase of the manufacturing process of structured light projector 300.

Further, in some embodiments, photodiodes 330 may detect light during a normal operational mode of structured light projector 300 (e.g., during mapping operations of a surrounding environment). In yet other embodiments, photodiodes 330 may detect light during a testing mode separate from the operational mode of structured light projector 300. For example, in the operational mode, VCSEL 322 may generate emitted light 130 of a first intensity (e.g., a series of relatively long light pulses) during operational mode and of a second, lesser intensity (e.g., a single, relatively short, light pulse) during testing mode. Further, in some embodiments, structured light projector 300 may employ testing mode prior to each operational mode to monitor the safety status of structured light projector 300.

In the embodiment of FIG. 4, in addition to VCSEL 322, submount 324, DOE stack 110 of DOEs 200, photodiode 330, and optical coupler 332, structured light projector 400 may include one or more light-emitting diodes (LEDs) 410 (e.g., infrared (IR) LEDs) that may serve as secondary light source 180 of FIG. 1 to generate light to be transmitted within and along DOEs 200 (e.g., by way of at least partial internal reflection) to photodiode 330. In FIG. 4, each DOE 200 is coupled with a corresponding LED 410 (e.g., by way of at least one optical coupler 332), but a single LED 410 may be coupled with more than one DOE 200 in other embodiments. Optical coupler 332 may be a material than matches a refractive index of DOEs 200 (e.g., an index-matching epoxy), as was noted above in conjunction with structured light projector 300 of FIG. 3. Also, while FIG. 4 depicts a single photodiode 330 and a single set of LEDs 410, additional pairings of photodiode 330 and LEDs 410 along additional edges of DOE stack 110 (e.g., forming an optical path orthogonal to that provided by LEDs 410 and photodiode 330) are also possible in other examples. Also, while LEDs 410 may be infrared LEDs, other types of light sources, including LEDs emitting light in the visible spectrum, may be employed in some embodiments.

In some embodiments, LEDs 410 may be operated (e.g., by controller 160) to inject light into their corresponding DOEs 200 that propagates therewithin to photodiode 330 (e.g., via optical couplers 332). The light detected by photodiode 330 may be used (e.g., by controller 160) to determine a safety status of structured light projector 400, as described above. In some examples, VCSEL 322 may be activated (e.g., to generate emitted light 130) in an operational mode (e.g., to map a surrounding environment) during first periods of time, and LEDs 410 and photodiode 330 may be used in a testing mode to determine the safety status of structured light projector 400 during second periods of time different from the first periods of time. Further, LEDs 410 may generate an amount or intensity of light different from that of VCSEL 322 (e.g., by use of differing light pulse durations) to determine the safety status (e.g., by way of detecting structural anomalies of DOEs 200, movement or misalignment of DOEs 200 or DOE stack 110, the presence of foreign liquids or other matter on DOEs 200, and so on, as described above).

Figure 5:
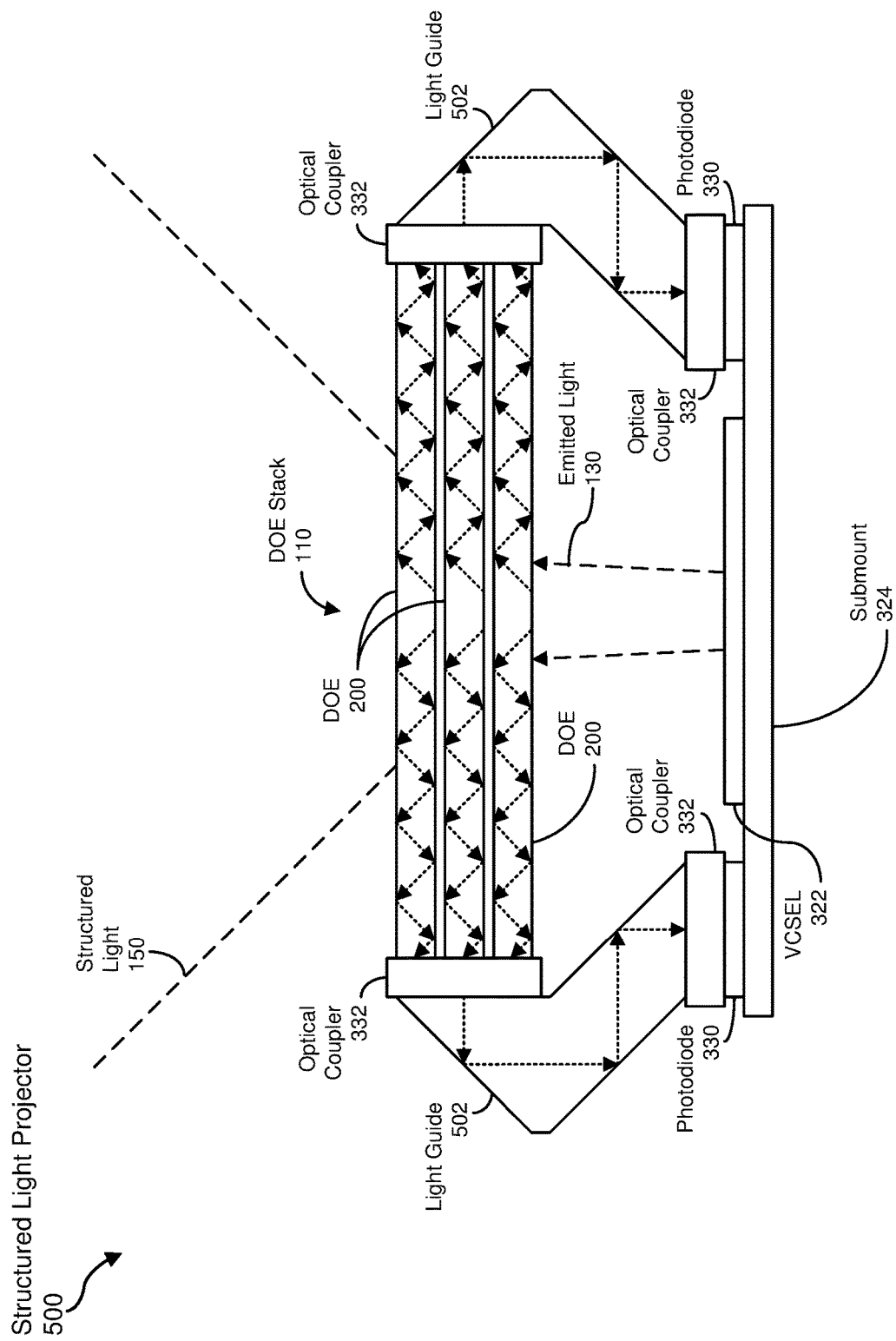
FIG. 5 is a side view of an exemplary structured light projector that includes at least one photodetector and at least one light guide for detecting light from an edge of the DOE stack in response to light from the primary light source.
Figure 6:
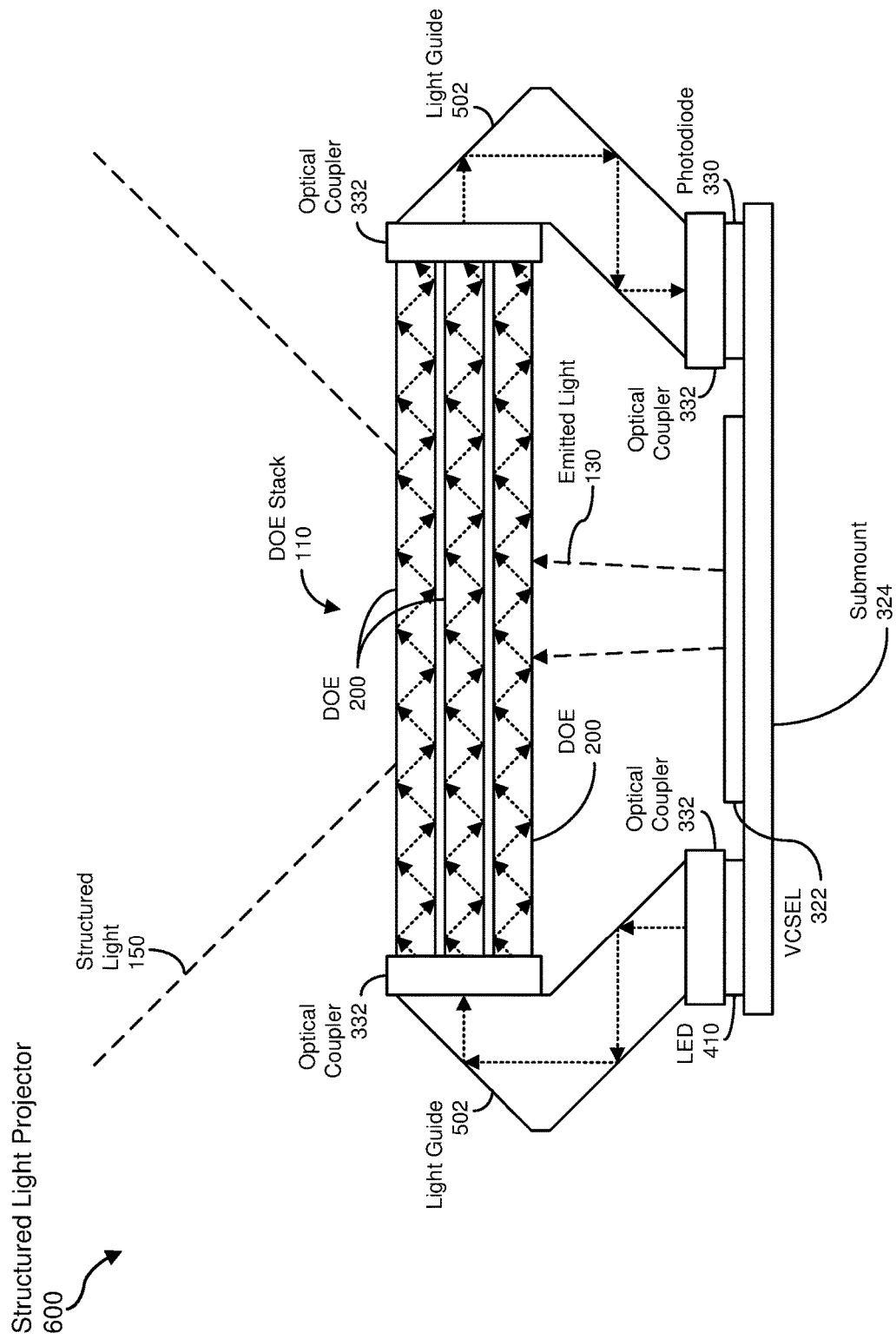
FIG. 6 is a side view of an exemplary structured light projector that includes at least one photodetector and at least one light guide for detecting light from an edge of the DOE stack in response to light from a secondary light source.

FIGS. 5 and 6 are side views of exemplary structured light projectors 500 and 600, respectively, that include one or more light guides 502 for directing light to one or more photodiodes 300 and/or from one or more LEDs 410. For example, structured light projector 500 of FIG. 5 may include one or more photodiodes 330 that are each optically coupled to an edge one or more DOEs 200 of DOE stack 110 by way of a corresponding light guide 502. Consequently, one or more photodiodes 330 may detect light emitted from an edge of DOE stack 110 in response to emitted light 130 emitted from VCSEL 322. As shown in FIG. 6, structured light projector 600 may further include at least one light guide 502 that optically couples one or more LEDs 410 to an edge of DOE stack 110 such that light from LEDs 410 may enter the edge of DOE stack 110. At least some of this light may then exit another edge of DOE stack 110 (e.g., opposing the first edge of DOE stack 110), whereby at least one second light guide 502 may guide the exiting light to one or more photodiodes 330 for detection. In some examples, each light guide 502 may be coupled to DOE stack 110, photodiode 330, and/or LED 410 by way of optical couplers 332, such as index-matching epoxy, as mentioned above.

In some embodiments, light guide 502 may be any optical element that guides most (e.g., substantially all) light from one location to another within structured light projector 600. In some examples, light guide 502 may be a substantially transparent material, and may facilitate guiding of light by way of total internal reflection (TIR). In some embodiments, light traveling within light guide 502 may encounter one or more interfaces of light guide 502 with another material (e.g., air) at a sufficient angle of incidence to cause that light to be internally reflected within light guide 502. In the particular examples of FIGS. 5 and 6, light guide 502 may generally present an angle of incidence of about 45 degrees at each interface encountered by the light between the surfaces at which the light enters or leaves light guide 502 (e.g., at optical couplers 332). However, many other types of optical structures may be employed for light guide 502 in other embodiments.

Also, as illustrated in FIGS. 5 and 6, light guides 502 may be structured to allow photodiodes 330 and/or LEDs 410 to be mounted on submount 324 with VCSEL 322. In such embodiments, use of submount 324 may provide a structural base, as well as power and control signal connections, for photodiode 330 and/or LED 410, thus possibly simplifying the processes involved in manufacturing structured light projectors 500 and 600. Moreover, in some embodiments, one or more light guides 502 may be incorporated into a housing or other mechanical structure for structured light projectors 500 and 600, such as a housing that mechanically couples submount 324 (and thus VCSEL 322) to DOE stack 110, thus potentially further simplifying the manufacturing of structured light projectors 500 and 600.

Figure 7:
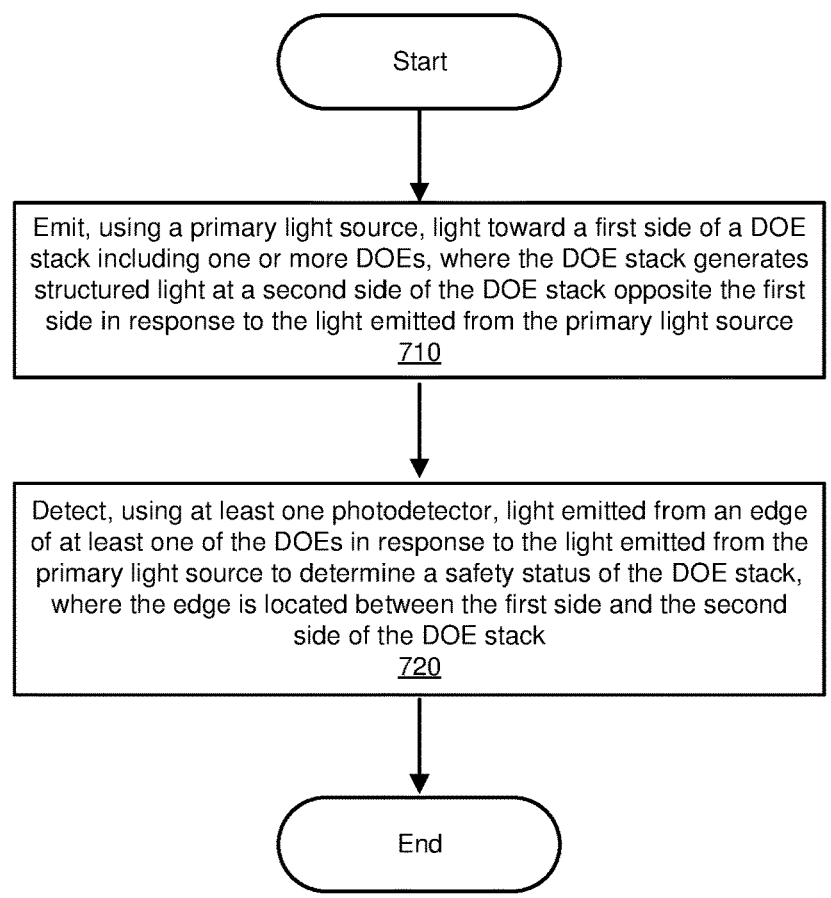
FIG. 7 is a flow diagram of an exemplary method of facilitating operational safety for a structured light projector.

FIG. 7 is a flow diagram of an exemplary method 700 of monitoring safety associated with a structured light projector (e.g., structured light projectors 100, 300, and 500 of FIGS. 1, 3, and 5). In method 700, at step 710, light may be emitted by a primary light source (e.g., primary light source 120 or VCSEL 322) toward a first side of a DOE stack (e.g., DOE stack 110) including one or more DOEs (e.g., DOEs 200), where the DOE stack generates structured light (e.g., structured light 150) at a second side of the DOE stack opposite the first side in response to the light emitted from the primary light source. In some examples, as discussed above, the structured light (e.g., including dots, lines, or the like) may be received by a camera or other light-detecting device to map a local environment.

At step 720, using at least one photodetector (e.g., photodetector 170 or photodiode 330), light emitted from an edge of at least one DOE of the DOE stack may be detected in response to the light emitted from the primary light source to determine a safety status of the DOE stack, where the edge is located between the first side and the second side of the DOE stack. In some embodiments, determination of the safety status may occur while the structured light projector is being employed to generate the structured light, while in other examples, light from the primary light source may be employed in an operational mode (e.g., to generate the structured light) and in a separate testing mode (e.g., to detect light using the photodetector).

Figure 8:
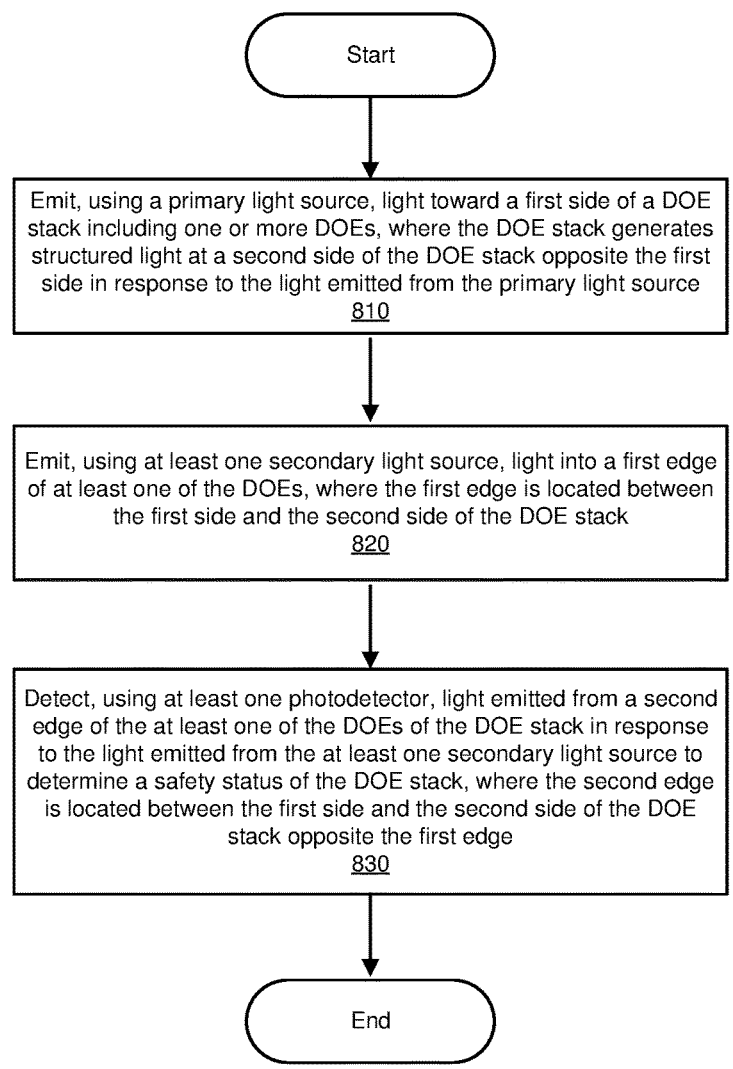
FIG. 8 is a flow diagram of another exemplary method of facilitating operational safety for a structured light projector.

FIG. 8 is a flow diagram of an exemplary method 800 of monitoring safety associated with a structured light projector (e.g., structured light projectors 100, 400, and 600 of FIGS. 1, 4, and 6). In method 800, at step 810, light may be emitted by a primary light source (e.g., primary light source 120 or VCSEL 322) toward a first side of a DOE stack (e.g., DOE stack 110) including one or more DOEs (e.g., DOEs 200), where the DOE stack generates structured light (e.g., structured light 150) at a second side of the DOE stack opposite the first side in response to the light emitted from the primary light source. In some examples, as discussed above, the structured light (e.g., including dots, lines, or the like) may be received by a camera or other light-detecting device to map a local environment.

At step 820, light may be emitted by at least one secondary light source (e.g., secondary light source 180, such as LEDs 410) into a first edge of at least one of the DOEs, where the first edge is located between the first side and the second side of the DOE stack.

At step 830, using at least one photodetector (e.g., photodetector 170 or photodiode 330), light emitted from a second edge of at least one DOE of the DOE stack may be detected in response to the light emitted from the at least one secondary light source to determine a safety status of the DOE stack, where the second edge is located between the first side and the second side of the DOE stack. In some embodiments, light from the primary light source may be employed in an operational mode (e.g., to generate the structured light), and light from the secondary light source may be used in a separate testing mode (e.g., to detect light using the photodetector).

As discussed above in conjunction with FIGS. 1-8, use of at least one photodetector optically coupled with an edge of at least optical element of a DOE stack, as employed in a structured light projector, may be used to determine a safety status of the DOE stack or, more generally, the structured light projector. The photodetector may detect light from the DOE stack that originates from a primary light source that is employed to generate structured light, or may detect light from a secondary light source optically coupled to another (e.g., opposing) edge of the DOE stack. In at least some examples, use of such a photodetector may facilitate the periodic detection of optical anomalies that may adversely affect the optical safety status of the structured light projector long after the projector has left the manufacturer.

EXAMPLE EMBODIMENTS

Example 1: A system for generating structured light that facilitates operational safety may include (1) a diffractive optical element (DOE) stack including one or more DOEs, where the DOE stack generates, in response to incoming light received at a first side of the DOE stack, structured light from a second side of the DOE stack opposite the first side, (2) a primary light source that emits the incoming light toward the first side of the DOE stack, and (3) at least one photodetector that detects light emitted from an edge of each of at least one of the DOEs of the DOE stack, where the edge is located between the first side and the second side of the DOE stack.

Example 2: The system of Example 1, where (1) the edge of the at least one of the DOEs may include a first edge of each of the DOEs, (2) the first edges of the DOEs may be aligned in a first single plane, and (3) the at least one photodetector may include a first photodetector that detects light emitted from each of the first edges of the DOEs simultaneously.

Example 3: The system of Example 2, where the system may further include an optical coupler optically coupling the first edges of the DOEs simultaneously to the first photodetector.

Example 4: The system of either Example 2 or Example 3, where (1) each of the at least one of the DOEs may further include a second edge, (2) the second edges of the DOEs may be aligned in a second single plane, and (3) the at least one photodetector may further include a second photodetector that detects light emitted from each of the second edges of the DOEs simultaneously.

Example 5: The system of Example 4, where the second single plane may lie parallel to, and opposite the DOE stack from, the first single plane.

Example 6: The system of Example 1, where the system may further include at least one light guide that optically couples the edge of each of the at least one of the DOEs of the DOE stack to the at least one photodetector.

Example 7: The system of Example 1, where the system may further include a controller that (1) operates the primary light source in an operational mode when using the DOE stack to generate the structured light, and (2) operates the primary light source in a testing mode when using the at least one photodetector to detect light emitted from the edge of each of the at least one of the DOEs of the DOE stack.

Example 8: The system of Example 7, where (1) the operational mode may include a plurality of light pulses of a first duration, and (2) the testing mode may include at least one light pulse of a second duration shorter than the first duration.

Example 9: The system of either Example 7 or Example 8, where the controller may compare a first amount of light detected at the at least one photodetector during a first use of the testing mode to a second amount of light detected at the at least one photodetector during a second use of the testing mode to determine a safety status of the system.

Example 10: The system of Example 1, where the system may further include at least one secondary light source that injects first test light into an additional edge of each of the at least one of the DOEs of the DOE stack, where the additional edge is located between the first side and the second side of the DOE stack.

Example 11: The system of Example 10, where the system may further include an optical coupler optically coupling the at least one secondary light source to the additional edge of each of the at least one of the DOEs of the DOE stack.

Example 12: The system of either Example 10 or Example 11, where the at least one secondary light source may include a single secondary light source that injects the first test light into the additional edge of each of the DOEs of the DOE stack.

Example 13: The system of either Example 10 or Example 11, where (1) the at least one secondary light source may include a plurality of secondary light sources, and (2) each of the plurality of secondary light sources may inject the first test light into the additional edge of a corresponding one of the DOEs of the DOE stack.

Example 14: The system of either Example 10 or Example 11, where the system may further include at least one additional secondary light source that injects second test light into a second additional edge of each of the at least one of the DOEs of the DOE stack, where the second additional edge is located between the first side and the second side of the DOE stack.

Example 15: The system of either Example 10 or Example 11, where the system may further include at least one light guide that optically couples the at least one secondary light source to the additional edge of each of the at least one of the DOEs of the DOE stack.

Example 16: The system of either Example 10 or Example 11, where the system may further include a controller that (1) operates the primary light source in an operational mode when using the DOE stack to generate the structured light, and (2) operates the at least one secondary light source in a testing mode when using the at least one photodetector to detect light emitted from the edge of each of the at least one of the DOEs of the DOE stack.

Example 17: The system of Example 16, where the controller may compare a first amount of light detected at the at least one photodetector during a first use of the testing mode to a second amount of light detected at the at least one photodetector during a second use of the testing mode to determine a safety status of the system.

Example 18: A method of facilitating operational safety in a structured light projector, where the method may include (1) emitting, using a primary light source, light toward a first side of a diffractive optical element (DOE) stack including one or more DOEs, where the DOE stack generated structured light at a second side of the DOE stack opposite the first side in response to the light emitted from the primary light source, and (2) detecting, using at least one photodetector, light emitted from an edge of at least one of the DOEs in response to the light emitted from the primary light source to determine a safety status of the DOE stack, where the edge is located between the first side and the second side of the DOE stack.

Example 19: A method of facilitating operational safety in a structured light projector, where the method may include (1) emitting, using a primary light source, light toward a first side of a diffractive optical element (DOE) stack including one or more DOEs, where the DOE stack generated structured light at a second side of the DOE stack opposite the first side in response to the light emitted from the primary light source, (2) emitting, using at least one secondary light source, light into a first edge of at least one of the DOEs, where the first edge is located between the first side and the second side of the DOE stack, and (3) detecting, using at least one photodetector, light emitted from a second edge of the at least one of the DOEs in response to the light emitted from the at least one secondary light source to determine a safety status of the DOE stack, where the second edge is located between the first side and the second side of the DOE stack opposite the first edge.

Example 20: The method of Example 19, where (1) the at least one secondary light source may include a secondary light source for each of the at least one of the DOEs, and (2) the at least one photodetector may include a single photodetector that detects light emitted from the at least one of the DOEs simultaneously.

Figure 9:
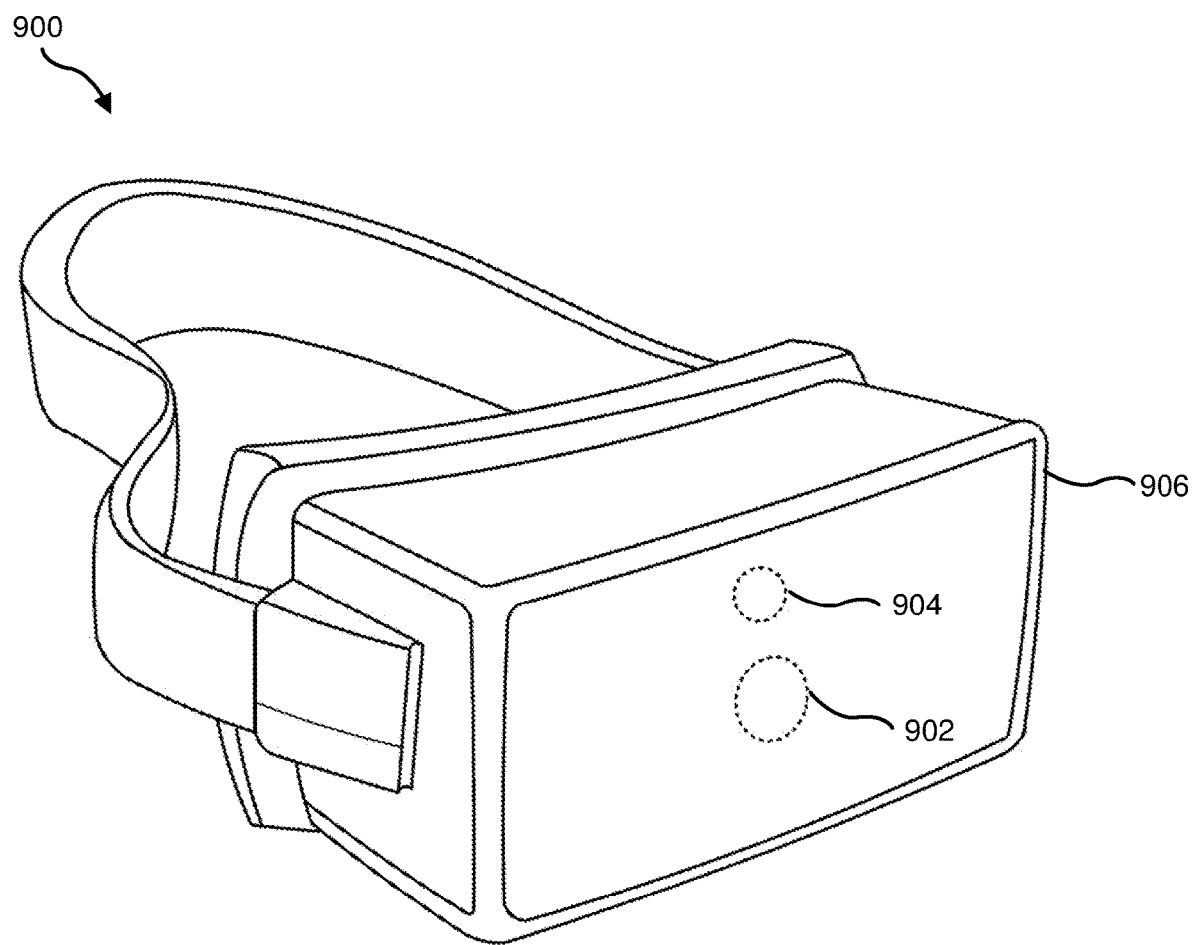
FIG. 9 is a perspective view of an exemplary head-mounted display (HMD) in which embodiments of a structured light projector may be employed.

FIG. 9 is a perspective view of an exemplary head-mounted display (HMD) 900 in which embodiments of a structured light projector (e.g., structured light projector 100, 300, 400, 500, or 600) may be employed. In an example, an imaging device 902 or system that incorporates a depth camera assembly or system may be included within HMD 900. As shown in FIG. 9, HMD 900 may include a front rigid body 906 through which an aperture (included within imaging device 902) may receive light. In some such examples, imaging device 902 may operate within a local area imaging assembly, which may be included within HMD 900, as illustrated in FIG. 9. In these examples, as will be discussed in greater detail in connection with FIG. 10, the local area imaging assembly may include an illumination source 904 (e.g., structured light projector 100, 300, 400, 500, or 600) that may emit light through front rigid body 906 of HMD 900.

Figure 10:
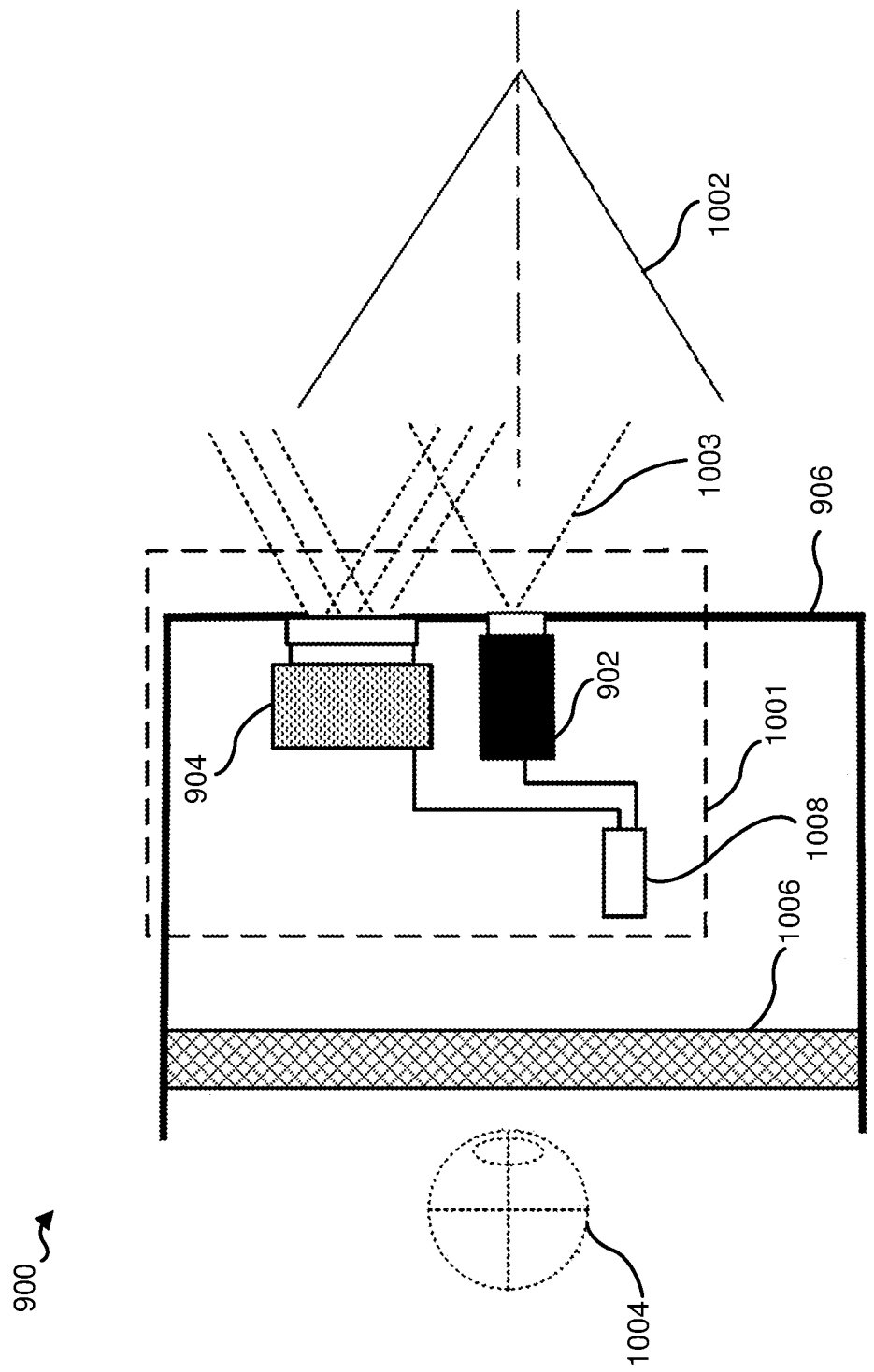
FIG. 10 is a cross-sectional view of the HMD of FIG. 7.

FIG. 10 represents a cross section of front rigid body 906 of HMD 900. As shown in FIG. 10, HMD 900 may include a local area imaging assembly 1001. In some examples, local area imaging assembly 1001 may be a device assembly configured to capture image data by way of received light 1003 that is utilized in determining, mapping, and/or tracking position, orientation, and/or movement of objects within an area, such as local area 1002 (e.g., an area surrounding HMD 900). In some examples, local area imaging assembly 1001 may include (1) imaging device 902 and (2) illumination source 904 configured to emit light (e.g., structured light 150 of FIG. 1, 3, 4, 5, or 6) into local area 1002.

In some embodiments, local area imaging assembly 1001 may determine depth and/or surface information for objects within local area 1002 in a variety of ways. For example, local area imaging assembly 1001 may be utilized in a simultaneous localization and mapping (SLAM) tracking system to identify and/or map features of local area 1002 and/or to identify a location, orientation, and/or movement of HMD 900 and/or other objects (e.g., hand-held controllers, users, etc.) in local area 1002. In some examples, illumination source 904 may emit a structured light pattern (e.g., structured light 150, such as a symmetric and/or quasi-random dot pattern, a grid pattern, horizontal bars, etc.) into local area 1002. In these examples, local area imaging assembly 1001 may determine the depth and/or surface information based on triangulation or perceived deformation of the emitted pattern. More specifically, in at least some examples, the depth and/or surface information may be determined by capturing received light 1003 reflected from local area 1002 using imaging device 902 and calculating the depth from local area imaging assembly 1001 to multiple points in local area 1002 (e.g., using trigonometry) based on the appearance of received light 1003 at imaging device 902, the orientation of illumination source 904 and imaging device 902, and the distance between illumination source 904 and imaging device 902.

In some examples, information collected by local area imaging assembly 1001 may be used as part of an image and/or video (e.g., an artificial reality image and/or video) displayed to a user wearing HMD 900. In one example, shown in FIG. 10, the image and/or video may be displayed to a user (e.g., via an eye 1004 of the user) by an electronic display 1006. Electronic display 1006 may represent a single electronic display or multiple electronic displays (e.g., a display for each eye of a user). Examples of electronic display 1006 may include, without limitation, a liquid crystal display (LCD), an organic light-emitting diode (OLED) display, an inorganic light-emitting diode (ILED) display, an active-matrix organic light-emitting diode (AMOLED) display, a transparent organic light-emitting diode (TOLED) display, a projector, a cathode ray tube, an optical mixer, and/or some combination thereof. The local area imaging assembly 1001 may also include an imaging controller 1008 (e.g., controller 160 of FIG. 1) that is coupled to illumination source 904 and/or imaging device 902.

In at least one embodiment, a head-mounted display system including HMD 900 may additionally or alternatively include controller tracking features (e.g., constellation tracking). For example, in addition to determining features of local area 1002, local area imaging assembly 1001 may track a position, orientation, and/or movement of one or more controller devices, such as hand-held controllers, that are utilized by a user for interacting with HMD 900 and/or local area 1002.

Aside from the embodiments of FIGS. 9 and 10 associated with a head-mounted display system, other systems providing some form of artificial reality, such as those that include near-eye displays (NEDs), may also benefit from the use of the examples of structured light projectors described above. Moreover, in some examples, other types of systems not associated with artificial reality technology may also advantageously employ the structured light projector embodiments discussed in detail above.

In some examples, the term "controller" generally refers to any type or form of hardware-implemented processing unit that may include hardware logic for performing various control functions, or that may be capable of interpreting and/or executing computer-readable instructions to perform such functions. Examples of controllers may include, without limitation, physical processors, such as microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality.

Artificial reality systems may be implemented in a variety of different form factors and configurations. Some artificial reality systems may be designed to work without near-eye displays (NEDs), an example of which is AR system 1100 in FIG. 11. Other artificial reality systems may include a NED that also provides visibility into the real world (e.g., AR system 1200 in FIG. 12) or that visually immerses a user in an artificial reality (e.g., VR system 1300 in FIG. 13). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Figure 11:
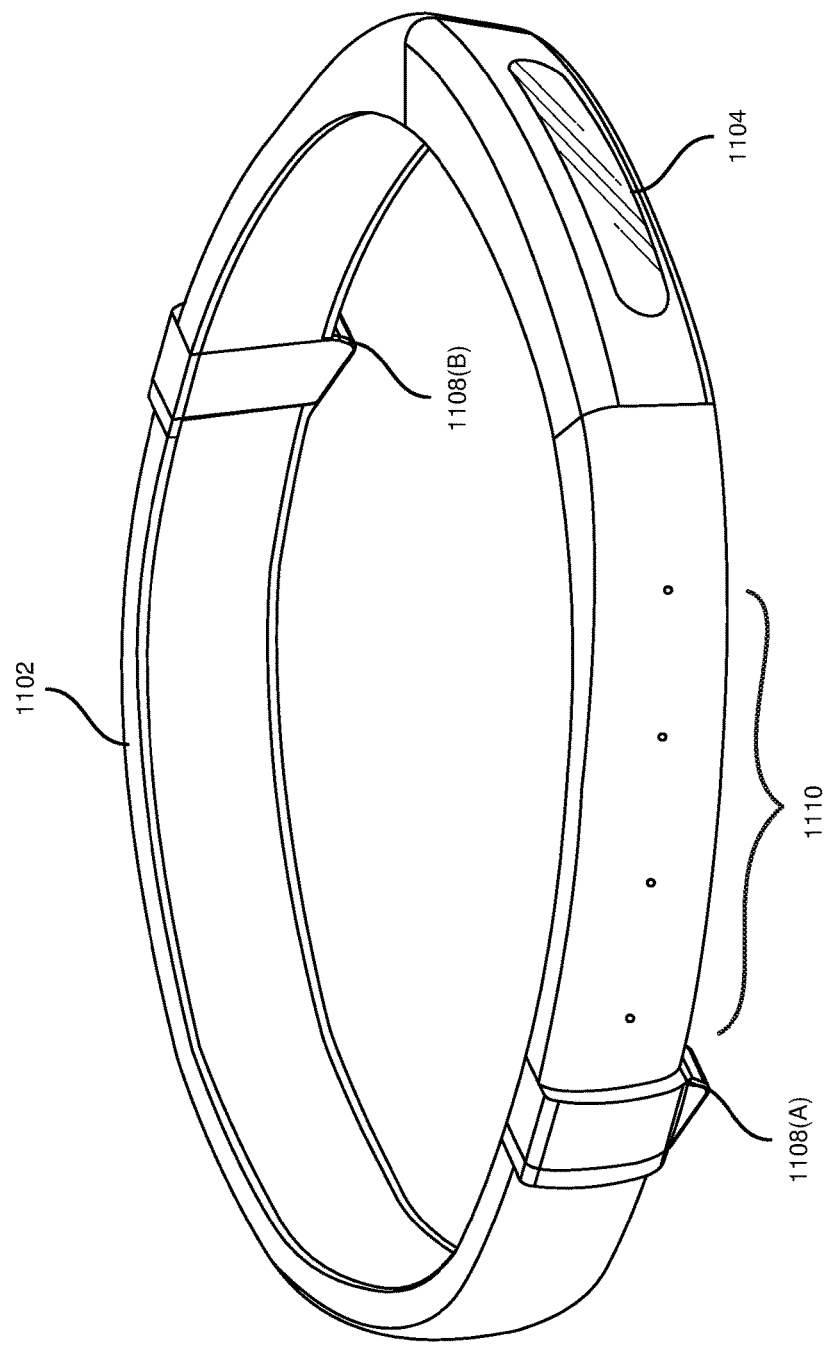
FIG. 11 is a perspective view of an exemplary augmented reality system that may employ various methods disclosed herein.

Turning to FIG. 11, AR system 1100 generally represents a wearable device dimensioned to fit about a body part (e.g., a head) of a user. As shown in FIG. 11, AR system 1100 may include a frame 1102 and a camera assembly 1104 that is coupled to frame 1102 and configured to gather information about a local environment by observing the local environment. AR system 1100 may also include one or more audio devices, such as output audio transducers 1108(A) and 1108(B) and input audio transducers 1110. Output audio transducers 1108(A) and 1108(B) may provide audio feedback and/or content to a user, and input audio transducers 1110 may capture audio in a user's environment.

As shown, AR system 1100 may not necessarily include a NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 1100 may not include a NED, AR system 1100 may include other types of screens or visual feedback devices (e.g., a display screen integrated into a side of frame 1102).

Figure 12:
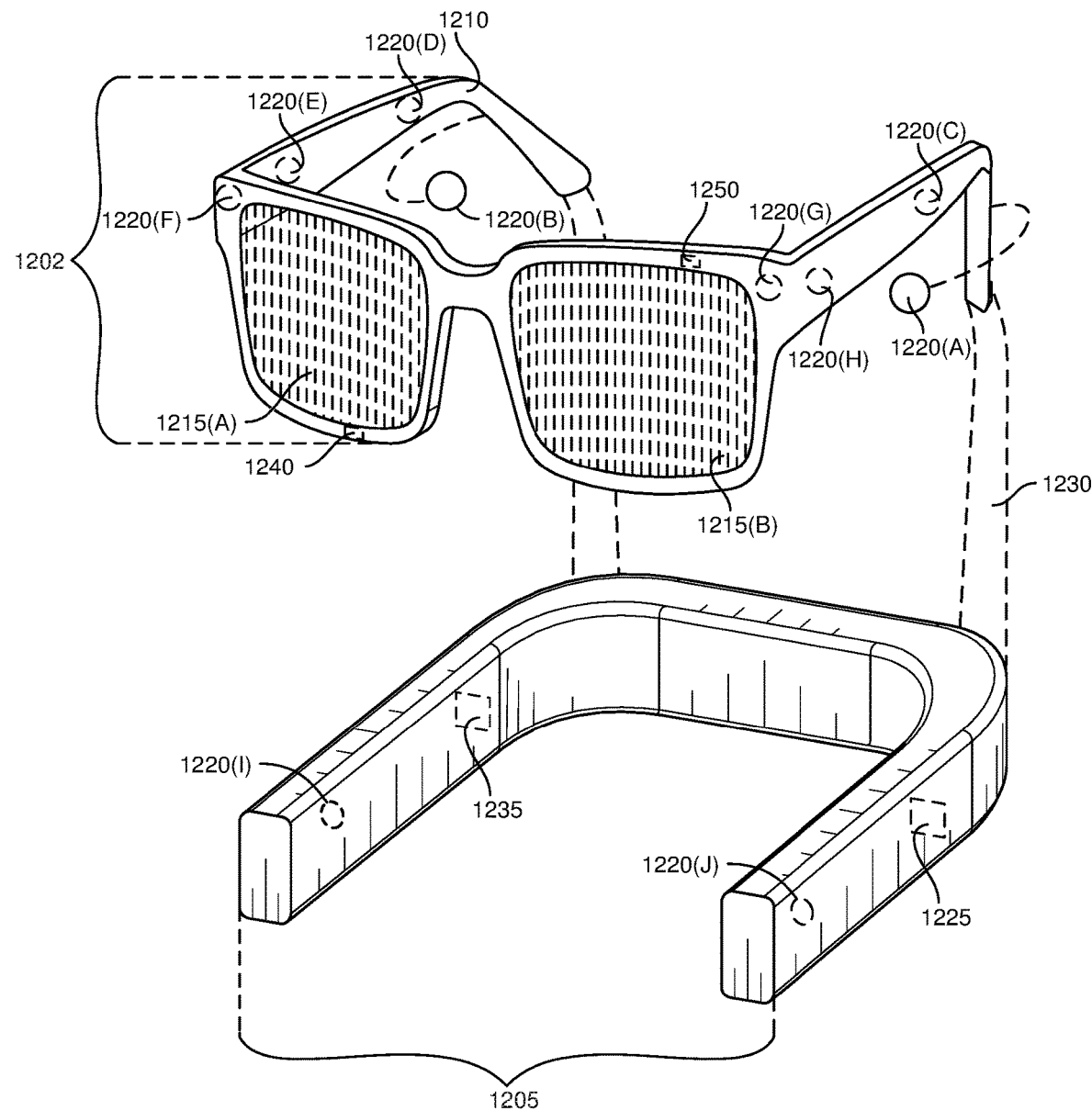
FIG. 12 is a perspective view of another exemplary augmented reality system that may employ various methods disclosed herein.

The embodiments discussed in this disclosure may also be implemented in AR systems that include one or more NEDs. For example, as shown in FIG. 12, AR system 1200 may include an eyewear device 1202 with a frame 1210 configured to hold a left display device 1215(A) and a right display device 1215(B) in front of a user's eyes. Display devices 1215(A) and 1215(B) may act together or independently to present an image or series of images to a user. While AR system 1200 includes two displays, embodiments of this disclosure may be implemented in AR systems with a single NED or more than two NEDs.

In some embodiments, AR system 1200 may include one or more sensors, such as sensor 1240. Sensor 1240 may generate measurement signals in response to motion of AR system 1200 and may be located on substantially any portion of frame 1210. Sensor 1240 may include a position sensor, an inertial measurement unit (IMU), a depth camera assembly, or any combination thereof. In some embodiments, AR system 1200 may or may not include sensor 1240 or may include more than one sensor. In embodiments in which sensor 1240 includes an IMU, the IMU may generate calibration data based on measurement signals from sensor 1240. Examples of sensor 1240 may include, without limitation, accelerometers, gyroscopes, magnetometers, other suitable types of sensors that detect motion, sensors used for error correction of the IMU, or some combination thereof.

AR system 1200 may also include a microphone array with a plurality of acoustic sensors 1220(A)-1220(J), referred to collectively as acoustic sensors 1220. Acoustic sensors 1220 may be transducers that detect air pressure variations induced by sound waves. Each acoustic sensor 1220 may be configured to detect sound and convert the detected sound into an electronic format (e.g., an analog or digital format). The microphone array in FIG. 12 may include, for example, ten acoustic sensors: 1220(A) and 1220(B), which may be designed to be placed inside a corresponding ear of the user, acoustic sensors 1220(C), 1220(D), 1220(E), 1220(F), 1220(G), and 1220(H), which may be positioned at various locations on frame 1210, and/or acoustic sensors 1220(I) and 1220(J), which may be positioned on a corresponding neckband 1205.

The configuration of acoustic sensors 1220 of the microphone array may vary. While AR system 1200 is shown in FIG. 12 as having ten acoustic sensors 1220, the number of acoustic sensors 1220 may be greater or less than ten. In some embodiments, using higher numbers of acoustic sensors 1220 may increase the amount of audio information collected and/or the sensitivity and accuracy of the audio information. In contrast, using a lower number of acoustic sensors 1220 may decrease the computing power required by the controller 1250 to process the collected audio information. In addition, the position of each acoustic sensor 1220 of the microphone array may vary. For example, the position of an acoustic sensor 1220 may include a defined position on the user, a defined coordinate on the frame 1210, an orientation associated with each acoustic sensor, or some combination thereof.

Acoustic sensors 1220(A) and 1220(B) may be positioned on different parts of the user's ear, such as behind the pinna or within the auricle or fossa. Or, there may be additional acoustic sensors on or surrounding the ear in addition to acoustic sensors 1220 inside the ear canal. Having an acoustic sensor positioned next to an ear canal of a user may enable the microphone array to collect information on how sounds arrive at the ear canal. By positioning at least two of acoustic sensors 1220 on either side of a user's head (e.g., as binaural microphones), AR device 1200 may simulate binaural hearing and capture a 3D stereo sound field around about a user's head. In some embodiments, acoustic sensors 1220(A) and 1220(B) may be connected to AR system 1200 via a wired connection, and in other embodiments, the acoustic sensors 1220(A) and 1220(B) may be connected to AR system 1200 via a wireless connection (e.g., a Bluetooth connection). In still other embodiments, acoustic sensors 1220(A) and 1220(B) may not be used at all in conjunction with AR system 1200.

Acoustic sensors 1220 on frame 1210 may be positioned along the length of the temples, across the bridge, above or below display devices 1215(A) and 1215(B), or some combination thereof. Acoustic sensors 1220 may be oriented such that the microphone array is able to detect sounds in a wide range of directions surrounding the user wearing the AR system 1200. In some embodiments, an optimization process may be performed during manufacturing of AR system 1200 to determine relative positioning of each acoustic sensor 1220 in the microphone array.

AR system 1200 may further include or be connected to an external device (e.g., a paired device), such as neckband 1205. As shown, neckband 1205 may be coupled to eyewear device 1202 via one or more connectors 1230. Connectors 1230 may be wired or wireless connectors and may include electrical and/or non-electrical (e.g., structural) components. In some cases, eyewear device 1202 and neckband 1205 may operate independently without any wired or wireless connection between them. While FIG. 12 illustrates the components of eyewear device 1202 and neckband 1205 in example locations on eyewear device 1202 and neckband 1205, the components may be located elsewhere and/or distributed differently on eyewear device 1202 and/or neckband 1205. In some embodiments, the components of eyewear device 1202 and neckband 1205 may be located on one or more additional peripheral devices paired with eyewear device 1202, neckband 1205, or some combination thereof. Furthermore, neckband 1205 generally represents any type or form of paired device. Thus, the following discussion of neckband 1205 may also apply to various other paired devices, such as smart watches, smart phones, wrist bands, other wearable devices, hand-held controllers, tablet computers, laptop computers, etc.

Pairing external devices, such as neckband 1205, with AR eyewear devices may enable the eyewear devices to achieve the form factor of a pair of glasses while still providing sufficient battery and computation power for expanded capabilities. Some or all of the battery power, computational resources, and/or additional features of AR system 1200 may be provided by a paired device or shared between a paired device and an eyewear device, thus reducing the weight, heat profile, and form factor of the eyewear device overall while still retaining desired functionality. For example, neckband 1205 may allow components that would otherwise be included on an eyewear device to be included in neckband 1205 since users may tolerate a heavier weight load on their shoulders than they would tolerate on their heads. Neckband 1205 may also have a larger surface area over which to diffuse and disperse heat to the ambient environment. Thus, neckband 1205 may allow for greater battery and computation capacity than might otherwise have been possible on a stand-alone eyewear device. Since weight carried in neckband 1205 may be less invasive to a user than weight carried in eyewear device 1202, a user may tolerate wearing a lighter eyewear device and carrying or wearing the paired device for greater lengths of time than a user would tolerate wearing a heavy standalone eyewear device, thereby enabling an artificial reality environment to be incorporated more fully into a user's day-to-day activities.

Neckband 1205 may be communicatively coupled with eyewear device 1202 and/or to other devices. The other devices may provide certain functions (e.g., tracking, localizing, depth mapping, processing, storage, etc.) to AR system 1200. In the embodiment of FIG. 12, neckband 1205 may include two acoustic sensors (e.g., 1220(I) and 1220(J)) that are part of the microphone array (or potentially form their own microphone subarray). Neckband 1205 may also include a controller 1225 and a power source 1235.

Acoustic sensors 1220(I) and 1220(J) of neckband 1205 may be configured to detect sound and convert the detected sound into an electronic format (analog or digital). In the embodiment of FIG. 12, acoustic sensors 1220(I) and 1220 (J) may be positioned on neckband 1205, thereby increasing the distance between the neckband acoustic sensors 1220(I) and 1220(J) and other acoustic sensors 1220 positioned on eyewear device 1202. In some cases, increasing the distance between acoustic sensors 1220 of the microphone array may improve the accuracy of beamforming performed via the microphone array. For example, if a sound is detected by acoustic sensors 1220(C) and 1220(D) and the distance between acoustic sensors 1220(C) and 1220(D) is greater than, e.g., the distance between acoustic sensors 1220(D) and 1220(E), the determined source location of the detected sound may be more accurate than if the sound had been detected by acoustic sensors 1220(D) and 1220(E).

Controller 1225 of neckband 1205 may process information generated by the sensors on neckband 1205 and/or AR system 1200. For example, controller 1225 may process information from the microphone array that describes sounds detected by the microphone array. For each detected sound, controller 1225 may perform a DoA estimation to estimate a direction from which the detected sound arrived at the microphone array. As the microphone array detects sounds, controller 1225 may populate an audio data set with the information. In embodiments in which AR system 1200 includes an inertial measurement unit, controller 1225 may compute all inertial and spatial calculations from the IMU located on eyewear device 1202. Connector 1230 may convey information between AR system 1200 and neckband 1205 and between AR system 1200 and controller 1225. The information may be in the form of optical data, electrical data, wireless data, or any other transmittable data form. Moving the processing of information generated by AR system 1200 to neckband 1205 may reduce weight and heat in eyewear device 1202, making it more comfortable to the user.

Power source 1235 in neckband 1205 may provide power to eyewear device 1202 and/or to neckband 1205. Power source 1235 may include, without limitation, lithium ion batteries, lithium-polymer batteries, primary lithium batteries, alkaline batteries, or any other form of power storage. In some cases, power source 1235 may be a wired power source. Including power source 1235 on neckband 1205 instead of on eyewear device 1202 may help better distribute the weight and heat generated by power source 1235.

As noted, some artificial reality systems may, instead of blending an artificial reality with actual reality, substantially replace one or more of a user's sensory perceptions of the real world with a virtual experience. One example of this type of system is a head-worn display system, such as VR system 1300 in FIG. 13, that mostly or completely covers a user's field of view. VR system 1300 may include a front rigid body 1302 and a band 1304 shaped to fit around a user's head. VR system 1300 may also include output audio transducers 1306(A) and 1306(B). Furthermore, while not shown in FIG. 13, front rigid body 1302 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in AR system 1100 and/or VR system 1300 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 1200 and/or VR system 1300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 1100, AR system 1200, and/or VR system 1300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 11 and 13, output audio transducers 1108(A), 1108(B), 1306(A), and 1306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1110 may include condenser microphones, dynamic microphones, ribbon microphones, and/or any other type or form of input transducer. In some embodiments, a single transducer may be used for both audio input and audio output.

Figure 13:
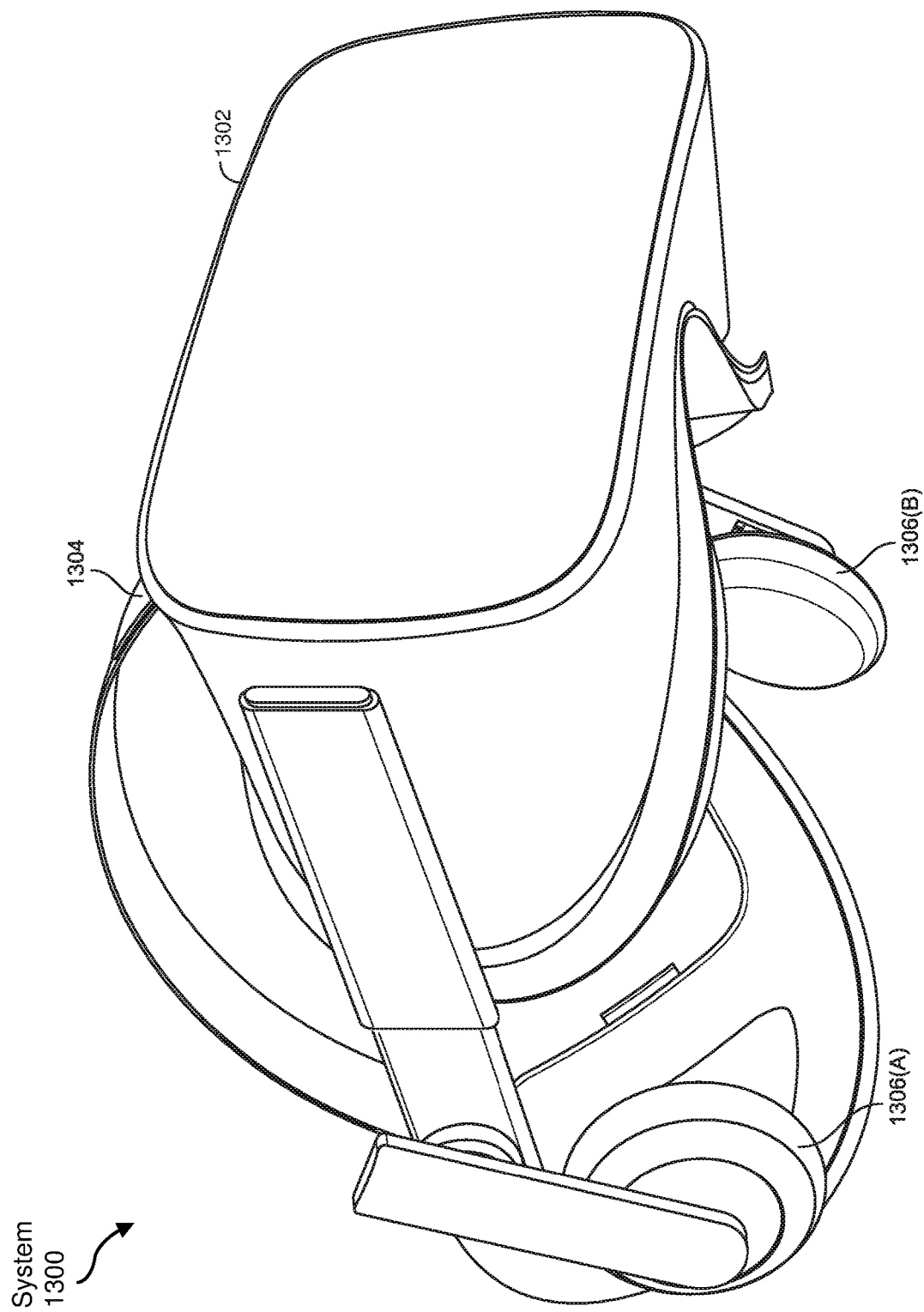
FIG. 13 is a perspective view of an exemplary virtual reality system that may employ various methods disclosed herein.

While not shown in FIGS. 11-13, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
a diffractive optical element (DOE) stack comprising a plurality of DOEs, wherein the DOE stack generates, in response to incoming light received at a first side of the DOE stack, structured light from a second side of the DOE stack opposite the first side;
a primary light source that emits the incoming light toward the first side of the DOE stack;
a first photodetector that simultaneously detects light emitted from a first edge of each of the plurality DOEs of the DOE stack, wherein the first edges of the DOEs are located between the first side and the second side of the DOE stack; and
an optical coupler optically coupling each of the first edges of the DOEs to the first photodetector.

2. The system of claim 1, wherein:
the first edges of the DOEs are aligned in a first single plane.

3. The system of claim 2, wherein:
each of the plurality of DOEs further comprises a second edge;
the second edges of the DOEs are aligned in a second single plane; and
the system further comprises a second photodetector that detects light emitted from each of the second edges of the DOEs simultaneously.

4. The system of claim 3, wherein the second single plane lies parallel to, and opposite the DOE stack from, the first single plane.

5. The system of claim 1, further comprising:
at least one light guide that optically couples the first edge of each of the plurality of DOEs of the DOE stack to the first photodetector.

6. The system of claim 1, further comprising:
a controller that:
operates the primary light source in an operational mode when using the DOE stack to generate the structured light; and
operates the primary light source in a testing mode when using the first photodetector to detect light emitted from the first edge of each of the plurality of DOEs of the DOE stack.

7. The system of claim 6, wherein:
the operational mode comprises a plurality of light pulses of a first duration; and
the testing mode comprises at least one light pulse of a second duration shorter than the first duration.

8. The system of claim 6, wherein:
the controller compares a first amount of light detected at the first photodetector during a first use of the testing mode to a second amount of light detected at the first photodetector during a second use of the testing mode to determine a safety status of the system.

9. The system of claim 1, further comprising:
at least one secondary light source that injects first test light into an additional edge of each of the plurality of DOEs of the DOE stack, wherein the additional edge is located between the first side and the second side of the DOE stack.

10. The system of claim 9, further comprising:
an optical coupler optically coupling the at least one secondary light source to the additional edge of each of the plurality of DOEs of the DOE stack.

11. The system of claim 9, wherein the at least one secondary light source comprises a single secondary light source that injects the first test light into the additional edge of each of the DOEs of the DOE stack.

12. The system of claim 9, wherein:
the at least one secondary light source comprises a plurality of secondary light sources; and
each of the plurality of secondary light sources injects the first test light into the additional edge of a corresponding one of the DOEs of the DOE stack.

13. The system of claim 9, further comprising:
at least one additional secondary light source that injects second test light into a second additional edge of each of the plurality of DOEs of the DOE stack, wherein the second additional edge is located between the first side and the second side of the DOE stack.

14. The system of claim 9, further comprising:
at least one light guide that optically couples the at least one secondary light source to the additional edge of each of the plurality of DOEs of the DOE stack.

15. The system of claim 9, further comprising:
a controller that:
operates the primary light source in an operational mode when using the DOE stack to generate the structured light; and
operates the at least one secondary light source in a testing mode when using the first photodetector to detect light emitted from the first edge of each of the plurality DOEs of the DOE stack.

16. The system of claim 15, wherein:
the controller compares a first amount of light detected at the first photodetector during a first use of the testing mode to a second amount of light detected at first photodetector during a second use of the testing mode to determine a safety status of the system.

17. A method comprising:
emitting, using a primary light source, light toward a first side of a diffractive optical element (DOE) stack comprising a plurality of DOEs, wherein the DOE stack generates structured light at a second side of the DOE stack opposite the first side in response to the light emitted from the primary light source; and
simultaneously detecting, using a first photodetector, light emitted from an edge of each of the plurality of DOEs in response to the light emitted from the primary light source to determine a safety status of the DOE stack, wherein the edges of the DOEs are located between the first side and the second side of the DOE stack.

18. A method comprising:
emitting, using a primary light source, light toward a first side of a diffractive optical element (DOE) stack comprising a plurality of DOEs, wherein the DOE stack generates structured light at a second side of the DOE stack opposite the first side in response to the light emitted from the primary light source;

emitting, using at least one secondary light source, light into a first edge of each of the plurality of DOEs, wherein the first edges of the DOEs are located between the first side and the second side of the DOE stack; and simultaneously detecting, using a first photodetector, light emitted from a second edge of each of the plurality of DOEs in response to the light emitted from the at least one secondary light source to determine a safety status of the DOE stack, wherein the second edges of the DOEs are located between the first side and the second side of the DOE stack opposite the first edge, wherein an optical coupler optically couples each of the second edges of the DOEs to the first photodetector.

19. The method of claim 18, wherein:

the at least one secondary light source comprises a secondary light source for each of the at least one of the DOEs.

* * * * *